US012135701B2

(12) United States Patent
Klein et al.

(10) Patent No.: US 12,135,701 B2
(45) Date of Patent: Nov. 5, 2024

(54) SELF CONTRASTIVE DECORRELATION BASED TRAINING OF MACHINE LEARNING MODELS

(71) Applicant: SAP SE, Walldorf (DE)

(72) Inventors: Tassilo Klein, Berlin (DE); Moin Nabi, Berlin (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/081,920

(22) Filed: Dec. 15, 2022

(65) Prior Publication Data

US 2024/0202176 A1    Jun. 20, 2024

(51) Int. Cl.
*G06F 16/00* (2019.01)
*G06F 16/22* (2019.01)
*G06F 16/242* (2019.01)
*G06F 17/15* (2006.01)

(52) U.S. Cl.
CPC ........ *G06F 16/2237* (2019.01); *G06F 16/243* (2019.01); *G06F 17/15* (2013.01)

(58) Field of Classification Search
CPC ............................ G06F 16/2237; G06F 16/243
See application file for complete search history.

(56) References Cited

U.S. PATENT DOCUMENTS

| | | | | |
|---|---|---|---|---|
| 10,565,498 | B1 * | 2/2020 | Zhiyanov | G06N 3/045 |
| 11,423,072 | B1 * | 8/2022 | Chen | G06F 18/253 |
| 11,610,061 | B2 * | 3/2023 | Eisenschlos | G06F 40/253 |

OTHER PUBLICATIONS

Zhuofeng Wu, CLEAR: Contrastive Learning for Sentence Representation Zhuofeng Wu, School of Information, University of Michigan (Year: 2020).*
Yuanmeng Yan, ConSERT: A Contrastive Framework for Self-Supervised Sentence Representation Transfer, Beijing University of Posts and Telecommunicators, Beijing, China (Year: 2021).*
Tianyu Gao, SimCSE: Simple Contrastive Learning of Sentence Embeddings, Department of Computer Science, Princeton University (Year: 2022).*

(Continued)

*Primary Examiner* — Thu Nguyet T Le
(74) *Attorney, Agent, or Firm* — Mintz Levin Cohn Ferris Glovsky and Popeo, P.C.

(57) ABSTRACT

A method for training a machine learning model using self-contrastive decorrelation is provided. The method comprises training a machine learning model by receiving a sentence including text, performing a first encoding operation on the sentence, performing a second encoding operation on the sentence, mapping the first vector representation on which a first augmentation operation is performed to a first high dimensional vector representation and the second vector representation on which a first augmentation operation is performed to a second high dimensional vector representation, generating a correlation matrix using the first high dimensional vector representation and the second high dimensional vector representation, and performing a decorrelation operation on the correlation matrix. The method includes receiving, by the trained machine learning model, an query that includes a target sentence, and outputting, using the trained machine learning model, a result sentence that satisfies a similarity metric relative to the target sentence.

15 Claims, 6 Drawing Sheets

(56) References Cited

OTHER PUBLICATIONS

Agirre, E et al., "*SEM 2013 shared task: Semantic textual similarity," In Second Joint Conference on Lexical and Computational Seman-tics (*SEM), vol. 1, In Proceedings of the Main Conference and the Shared Task: Semantic Textual Similarity, pp. 32-43.
Agirre, E. et al., "SemEval-2012 task 6: A pilot on semantic textual similarity," *SEM 2012: The First Joint Conference on Lexical and Computational Semantics—vol. 1, In Proceedings of the main conference and the shared task (SemEval 2012), pp. 385-393.
Agirre, E. et al., "SemEval-2014 task 10: Multilingual semantic textual similarity," In Proceedings of the 8th International Workshop on Semantic Evaluation (SemEval 2014), pp. 81-91.
Agirre, E. et al., "SemEval-2015 task 2: Semantic textual similarity, English, Spanish and pilot on interpretability," In Proceedings of the 9th International Workshop on Semantic Evaluation (SemEval 2015), pp. 252-263.
Agirre, E. et al., "SemEval-2016 task 1: Semantic textual similarity, monolingual and cross-lingual evaluation," In Proceedings of the 10th International Workshop on Semantic Evaluation (SemEval-2016), Association for Computational Linguistics, pp. 497-511.
Carlsson, F. et al., "Semantic re-tuning with contrastive tension," In International Conference on Learning Representations, 2020.
Cer, D. et al., "SemEval-2017 task 1: Semantic textual similarity multilingual and crosslingual focused evaluation," In Proceedings of the 11th International Workshop on Semantic Evaluation (SemEval-2017), pp. 1-14.
Chen, T. et al., "A simple framework for contrastive learning of visual representations," 2020, pp. 1597-1607.
Chen, X. et al., "Exploring simple Siamese representation learning," In Proceedings of the IEEE/CVF Conference on Computer Vision and Pattern Recognition, 2021, pp. 15750-15758.
Chen, X. et al., "Improved baselines with momentum contrastive learning," 2020, arXiv preprint arXiv:2003.04297.
Conneau, A. et al., SentEval: An evaluation toolkit for universal sentence representations, 2018, arXiv preprint ArXiv:1803.05449.
Devlin, J. et al., "BERT: Pre-training of deep bidirectional transformers for language understanding," 2018, arXiv preprint arXiv:1810.04805.
Devlin, J. et al., "BERT: Pre-training of deep bidirectional transformers for language understanding," Proceedings of NAACL-HLT 2019, pp. 4171-4186.
Dolan, W.B. et al., "Automatically constructing a corpus of sentential paraphrases," In Proceedings of the Third International Workshop on Paraphrasing (IWP2005), 2005, pp. 9-16.
Ermolov, A. et al., "Whitening for self-supervised representation learning," In Proceedings of the 38th International Conference on Machine Learning, PMLR, 2021, pp. 3015-3024.
Fang, H. et al., "CERT: Contrastive self-supervised learning for language understanding," 2020, arXiv preprint arXiv:2005.12766.
Gao, T. et al., "SimCSE: Simple contrastive learning of sentence embeddings," In Proceedings of the 2021 Conference on Empirical Methods in Natural Language Processing, Online and Punta Cana, Dominican Republic. Association for Computational Linguistics, 2021, pp. 6894-6910.
Giorgi, J. et al., "DeCLUTR: Deep contrastive learning for unsupervised textual representations," In Proceedings of the 59th Annual Meeting of the Association for Computational Linguistics and the 11th International Joint Conference on Natural Language Processing (vol. 1: Long Papers), Online. Association for Computational Linguistics, 2021, pp. 879-895.
Grill, J.-B. et al., "Bootstrap your own latent: A new approach to self-supervised learning," 2020, arXiv preprint arXiv:2006.07733.
He, K. et al., "Momentum contrast for unsupervised visual representation learning," In Proceedings of the IEEE/CVF Conference on Computer Vision and Pattern Recognition (CVPR), 2020, pp. 9729-9738.
Hu, M. et al., "Mining and summarizing customer reviews," In ACM SIGKDD International Conference on Knowledge Discovery and Data Mining, 2004.
Klein, T. et al., "Contrastive self-supervised learning for commonsense reasoning," In Proceedings of the 58th Annual Meeting of the Association for Computational Linguistics, Online. Association for Computational Linguistics, 2020, pp. 7517-7523.
Lan, Z. et al., "ALBERT: A lite bert for self-supervised learning of language representations," 2019, arXiv preprint arXiv: 1909.11942.
Liu, Y. et al., "ROBERTa: A robustly optimized bert pretraining approach," 2019, arXiv preprint arXiv: 1907.11692.
Marelli, M. et al., "A SICK cure for the evaluation of compositional distributional semantic models," 2014, pp. 216-223.
McCann, B. et al., "Learned in translation: Contextualized word vectors," 2017, arXiv preprint arXiv: 1708.00107.
Mikolov, T. et al., "Efficient estimation of word representations in vector space," 2013, arXiv preprint arXiv: 1301.3781.
Pang, B. et al.,"A sentimental education: Sentiment analysis using subjectivity summarization based on minimum cuts," 2004, pp. 271-278.
Pang, B. et al., "Seeing stars: Exploiting class relationships for sentiment categorization with respect to rating scales," 2005, pp. 115-124.
Pennington, J. et al., "GloVe: Global vectors for word representation," In Proceedings of the 2014 Conference on Empirical Methods in Natural Language Processing (EMNLP), 2014, pp. 1532-1543.
Peters, M.E. et al., "Deep contextualized word representations," 2018, arXiv preprint arXiv: 1802.05365.
Radford, A. et al., "Improving language understanding by generative pre-training," 2018.
Reimers, N. et al., "Sentence-BERT: Sentence embeddings using Siamese BERT-networks," In Proceedings of the 2019 Conference on Empirical Methods in Natural Language Processing and the 9th International Joint Conference on Natural Language Processing (EMNLP-IJCNLP), Hong Kong, China. Association for Computational Linguistics, 2019, pp. 3982-3992.
Socher, R. et al., "Recursive deep models for semantic compositionality over a sentiment tree-bank," 2013, pp. 1631-1642.
Su, J. et al., "Whitening sentence representations for better semantics and faster retrieval," 2021, arXiv preprint arXiv: 2103.15316.
Voorhees, E.M. et al., "Building a question answering test collection," In the 23rd Annual International ACM SIGIR Conference on Research and Development in Information Retrieval, 2000, pp. 200-207.
Wang, T. et al., "Understanding contrastive representation learning through alignment and uniformity on the hypersphere," In International Conference on Machine Learning, PMLR, 2020, pp. 9929-9939.
Wiebe, J. et al., "Annotating expressions of opinions and emotions in language," Language resources and evaluation, 39 (2-3), 2005, pp. 165-210.
Wolf, T. et al., "Transformers: State-of-the-art natural language processing," In Proceedings of the 2020 Conference on Empirical Methods in Natural Language Processing: System Demonstrations, Online. Association for Computational Linguistics,—2020, pp. 38-45.
Wu, Z. et al., "CLEAR: Contrastive learning for sentence representation," 2020, arXiv preprint arXiv:2012.15466.
Zbontar, J. et al., "Barlow twins: Self-supervised learning via redundancy reduction," 2021, arXiv preprint arXiv:2103.03230.
Zhang, Y. et al., "An unsupervised sentence embedding method by mutual information maximization," 2020, pp. 1601-1610.

* cited by examiner

SELF CONTRASTIVE DECORRELATION BASED TRAINING OF MACHINE LEARNING MODELS

TECHNICAL FIELD

The subject matter described herein generally relates to self-supervised training of machine learning models, and more particularly, to contrastive decorrelation based self-supervised training of machine learning models.

BACKGROUND

Training machine learning models to determine sentence embeddings in the form of numerical representations of textual content are useful in various applications such as machine translation, sentiment analysis, data retrieval, semantic search and similarity determination, and so forth. The training of these models involves the use of self-supervised pre-training schemes which operate to predict sentiment, meaning, and so forth, from a sentence using a subset of the information derived from the sentence. These schemes train various machine learning models based on contrastive representations, namely training data that includes a combination of positive pairs (sentences or phrases having a similar meaning) and negative pairs (sentences or phrases having a dissimilar meaning), in order to determine various characteristics of these sentences, e.g., meaning, context, sentiment, and so forth, of these sentences. However, negative pairs are memory intensive, challenging to generate automatically, require a large dataset.

SUMMARY

Systems, methods, and articles of manufacture, including computer program products, are provided for training a machine learning model using self-contrastive decorrelation. In one aspect, there is provided a computer-implemented method comprising: training a machine learning model by receiving a sentence including a plurality of text, performing a first encoding operation on the sentence, the first encoding operation comprising: generating a first vector representation of the sentence, the first vector representation including numerical elements representing the plurality of text, and performing a first augmentation operation on the first vector representation, the first augmentation operation including masking one or more of the numerical elements of the first vector representation in accordance with a first dropout ratio, performing a second encoding operation on the sentence, the second encoding operation comprising: generating a second vector representation of the sentence, the second vector representation including additional numerical elements representing the plurality of text, and performing a second augmentation operation on the second vector representation, the second augmentation operation including masking one or more of the numerical elements of the second vector representation in accordance with a second dropout ratio, wherein the second dropout ratio is larger than the first dropout ratio, mapping the first vector representation on which the first augmentation operation is performed to a first high dimensional vector representation and the second vector representation on which the first augmentation operation is performed to a second high dimensional vector representation, generating a correlation matrix using the first high dimensional vector representation and the second high dimensional vector representation, and performing a decorrelation operation on the correlation matrix.

The method also comprises receiving, by the machine learning model that is trained, an inquiry that includes a target sentence, and outputting, using the machine learning model that is trained, a result sentence that satisfies a similarity metric relative to the target sentence.

In some variations, one or more of the features disclosed herein including the following features can optionally be included in any feasible combination. The first vector representation of the sentence on which the first augmentation operation is performed satisfies a first similarity threshold relative to a sentiment of the sentence including the plurality of text.

In some variations, the second vector representation of the sentence on which the second augmentation operation is performed satisfies a second similarity threshold relative to the sentiment of the sentence including the plurality of text. In some variations, the second similarity threshold is less than the first similarity threshold.

In some variations, the performing of the decorrelation operation on the correlation matrix is based on implementation of a loss objective decorrelation function. In some variations, the loss objective decorrelation function comprises an augmentation invariance term, feature redundancy management term, and a hyper-parameter.

In some variations, the performing of the decorrelation operation based on the implementation of the loss objective decorrelation function comprises: multiplying the hyper-parameter with the feature redundancy management term; and summing the augmentation invariance term with the multiplying of the hyper-parameter with the feature redundancy management term.

In some variations, the computer implemented method further comprises: receiving an image, performing a third encoding operation on the image, the first encoding operation comprising: generating a third vector representation of the image, the third vector representation including numerical elements representing the image, and performing a third augmentation operation on the third vector representation, the third augmentation operation including masking one or more of the numerical elements of the third vector representation in accordance with a third dropout ratio, performing a fourth encoding operation on the image, the fourth encoding operation comprising: generating a fourth vector representation of the image, the fourth vector representation including additional numerical elements representing the image, and performing a fourth augmentation operation on the fourth vector representation, the fourth augmentation operation including masking one or more of the numerical elements of the fourth vector representation in accordance with a fourth dropout ratio, wherein the fourth dropout ratio is larger than the third dropout ratio, mapping the third vector representation on which the third augmentation operation is performed to a third high dimensional vector representation and the fourth vector representation on which the fourth augmentation operation is performed to a fourth high dimensional vector representation, generating an additional correlation matrix using the third high dimensional vector representation and the fourth high dimensional vector representation, and performing an additional decorrelation operation on the additional correlation matrix.

In another aspect, there is provided a system comprising: at least one data processor; and at least one memory storing instructions, which when executed by the at least one data processor, cause operations comprising: training a machine learning model by receiving a sentence including a plurality of text, performing a first encoding operation on the sentence, the first encoding operation comprising: generating a first vector representation of the sentence, the first vector representation including numerical elements representing the plurality of text, and performing a first augmentation operation on the first vector representation, the first augmentation operation including masking one or more of the numerical elements of the first vector representation in accordance with a first dropout ratio, performing a second encoding operation on the sentence, the second encoding operation comprising: generating a second vector representation of the sentence, the second vector representation including additional numerical elements representing the plurality of text, and performing a second augmentation operation on the second vector representation, the second augmentation operation including masking one or more of the numerical elements of the second vector representation in accordance with a second dropout ratio, wherein the second dropout ratio is larger than the first dropout ratio, mapping the first vector representation on which the first augmentation operation is performed to a first high dimensional vector representation and the second vector representation on which the first augmentation operation is performed to a second high dimensional vector representation, generating a correlation matrix using the first high dimensional vector representation and the second high dimensional vector representation, and performing a decorrelation operation on the correlation matrix. Further the operations include receiving, by the machine learning model that is trained, an inquiry that includes a target sentence, and outputting, using the machine learning model that is trained, a result sentence that satisfies a similarity metric relative to the target sentence.

In yet another aspect, there is provided a non-transitory computer-readable storage medium comprising programming code, which when executed by at least one data processor, causes operations comprising: training a machine learning model by receiving a sentence including a plurality of text, performing a first encoding operation on the sentence, the first encoding operation comprising: generating a first vector representation of the sentence, the first vector representation including numerical elements representing the plurality of text, and performing a first augmentation operation on the first vector representation, the first augmentation operation including masking one or more of the numerical elements of the first vector representation in accordance with a first dropout ratio, performing a second encoding operation on the sentence, the second encoding operation comprising: generating a second vector representation of the sentence, the second vector representation including additional numerical elements representing the plurality of text, and performing a second augmentation operation on the second vector representation, the second augmentation operation including masking one or more of the numerical elements of the second vector representation in accordance with a second dropout ratio, wherein the second dropout ratio is larger than the first dropout ratio, mapping the first vector representation on which the first augmentation operation is performed to a first high dimensional vector representation and the second vector representation on which the first augmentation operation is performed to a second high dimensional vector representation, generating a correlation matrix using the first high dimensional vector representation and the second high dimensional vector representation, and performing a decorrelation operation on the correlation matrix. Further the operations include receiving, by the machine learning model that is trained, an inquiry that includes a target sentence, and outputting, using the machine learning model that is trained, a result sentence that satisfies a similarity metric relative to the target sentence.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the generation of a user interface for accessing one or more software applications, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

As stated above, various machine learning models undergo unsupervised training with the use of contrastive representations. Broadly speaking, contrastive representations may correspond to training data that includes a combination of a plurality of positive pairs (sentences or phrases having a similar meaning) and negative pairs (sentences or phrases having a dissimilar or meaning). The use of such training data exposes the model to a wide spectrum of possible contexts, meanings, sentiments, and so forth, for various sentences. However, generating negative pairs is challenging, memory intensive, and requires a large dataset.

A self-contrastive decorrelation (SCD) based self-supervised training of a machine learning model described herein addresses and overcomes the above described deficiencies. In particular, the SCD technique described herein enables the training of machine learning models such that these models operate to perform sentence sentiment analysis, sentence similarity analysis, semantic search, and so forth, at a level of accuracy that matches or exceeds the above described techniques. However, the SCD technique does not require the use of explicit negative pairs. Instead, the SCD technique trains the model to determine embeddings (e.g., vector representations) in order to perform sentence sentiment analysis, sentence similarity analysis, semantic search, and so forth, by performing self-contrasts on augmentations of a single sample, e.g., a single sentence.

For example, for a given sample sentence of "I have a black phone," instead of generating a negative version of this sentence, e.g., "I do not have a phone", the SCD technique described herein implements encoding operations on the sentence to generate vectors or numerical representations that describe the characteristics of the sentence "I have a black phone" and proceed to implement minor perturbations or alterations to the vector representations of the sentence. It is noted that SCD technique involve vector augmentation that occurs in the vector or embedding space. For example, the SCD technique may involve minor changes to elements of the generated vectors, which may correspond to an alteration of a meaning of the sample sentence from "I have a black phone" to "You have a black phone", "Have a phone", and so forth. It is noted that while these perturbations or alterations are implemented on the vectors derived from the sample sentence, the subject matter of the sample sentence "I have a black phone" is not altered. In other words, the perturbations or alternations occur in the vector space, and the training of the model occurs on these alterations. As such, unlike traditional techniques, the SCD technique requires a much smaller dataset (e.g., the sample sentence) and does not involve the generation of explicit negative pairs as in the traditional techniques. Instead, as described above, the SCD technique utilizes minor alterations to the vector representations of a particular sentence in order to train the model on wide spectrum of varying meanings of the sentence.

Figure 1:
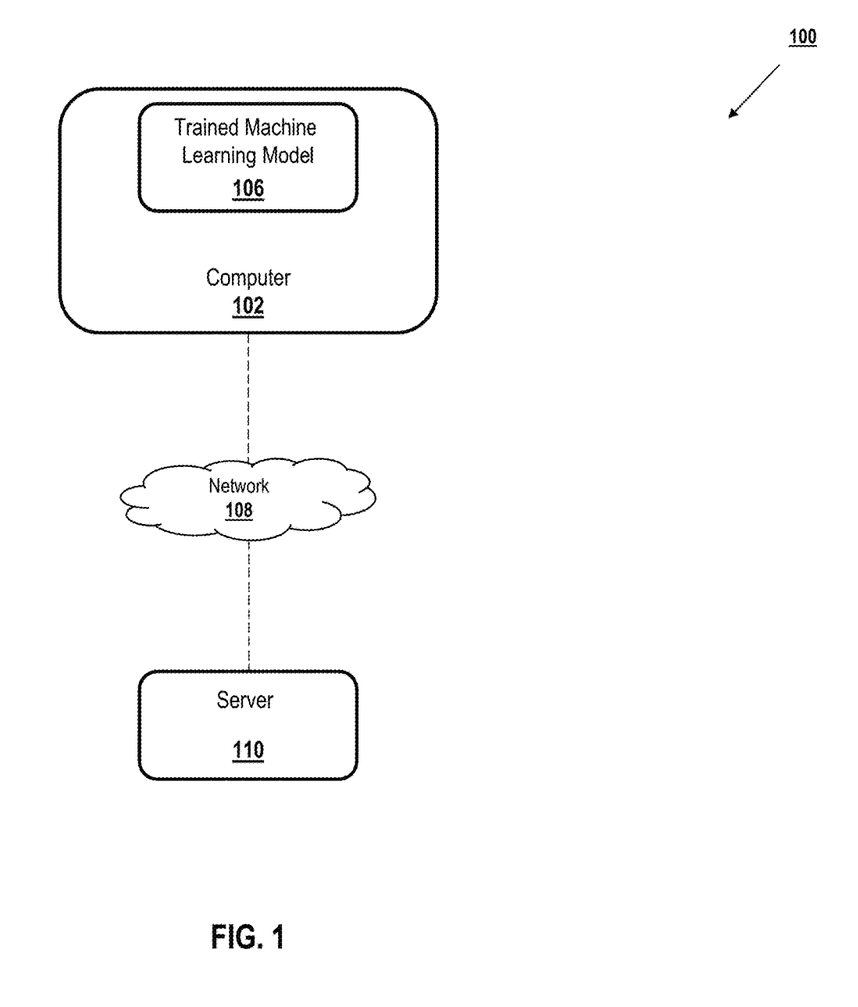
FIG. 1 depicts an example architecture, in accordance with some embodiments.

FIG. 1 depicts an example architecture 100 that is used to execute implementations of the present disclosure. In the depicted example, a machine learning model that is trained using the SCD technique as described herein, namely a trained machine learning model 106, may be operable on a computer 102, which is communicatively coupled to a server 110, for example, via a network 108. In aspects, the communication between the computer 102 and the server 110 may occur wirelessly or via a wired connection. In aspects, the trained machine learning model 106 may operate as part of one or more software application for the purpose of performing various tasks such as semantic analysis, sentence similarity operations, sentence matching and retrieval, and so forth. In aspects, the trained machine learning model 106 may also operate to identify images, video content, audio content, and so forth, that are similar to a particular image, video content, or audio content. In short, the trained machine learning model 106 operates to accurately identify content that is similar to other content without undergoing a training process that involves the use of explicitly negative pairs, as described above. It is noted that the trained machine learning model 106 may be useful in and operate in applications involving speech recognition, text and image classification, text and image clustering, and so forth.

Figure 2A:
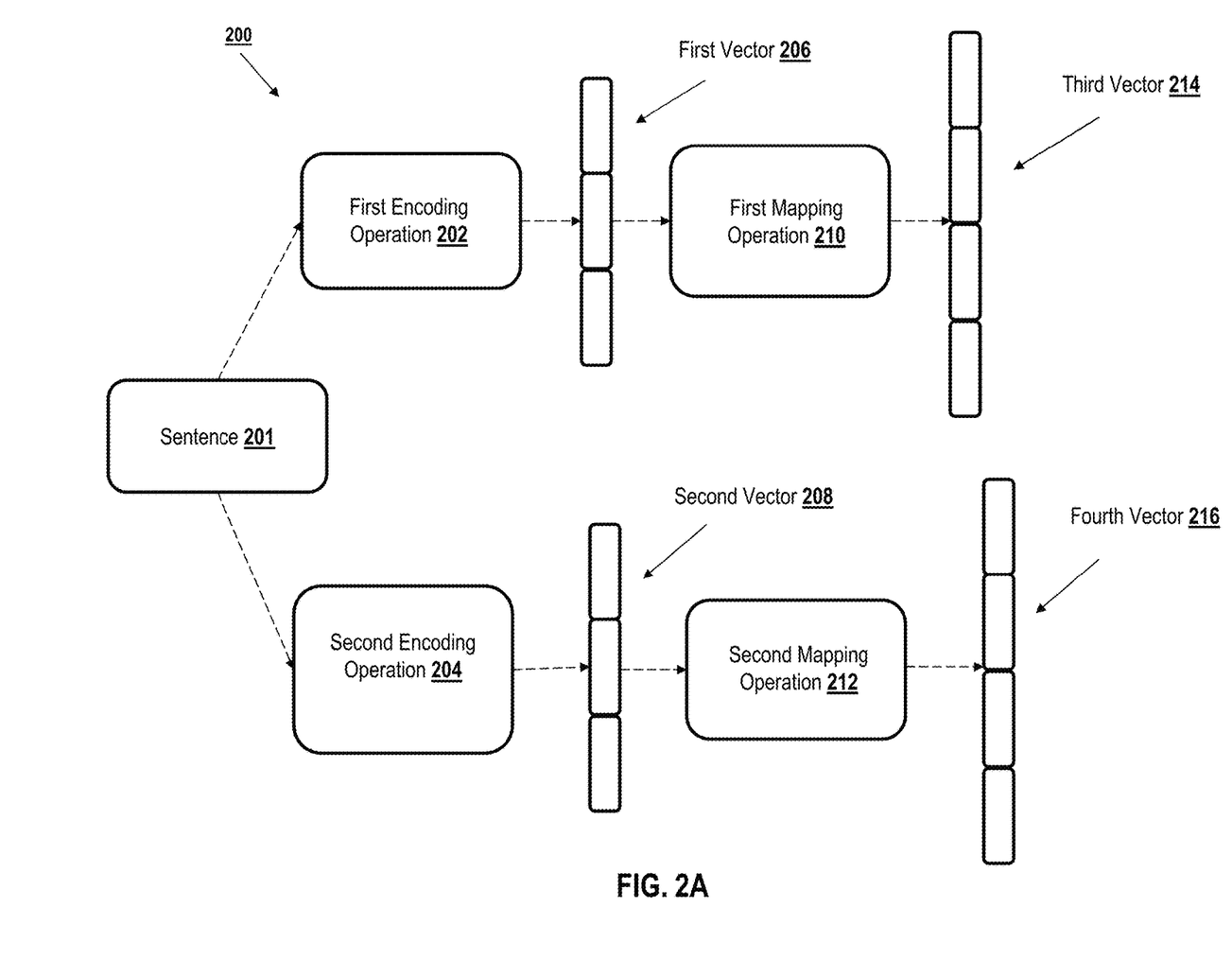
FIG. 2A depicts a portion of the process for training of the machine learning model, in accordance with some embodiments.
Figure 2B:
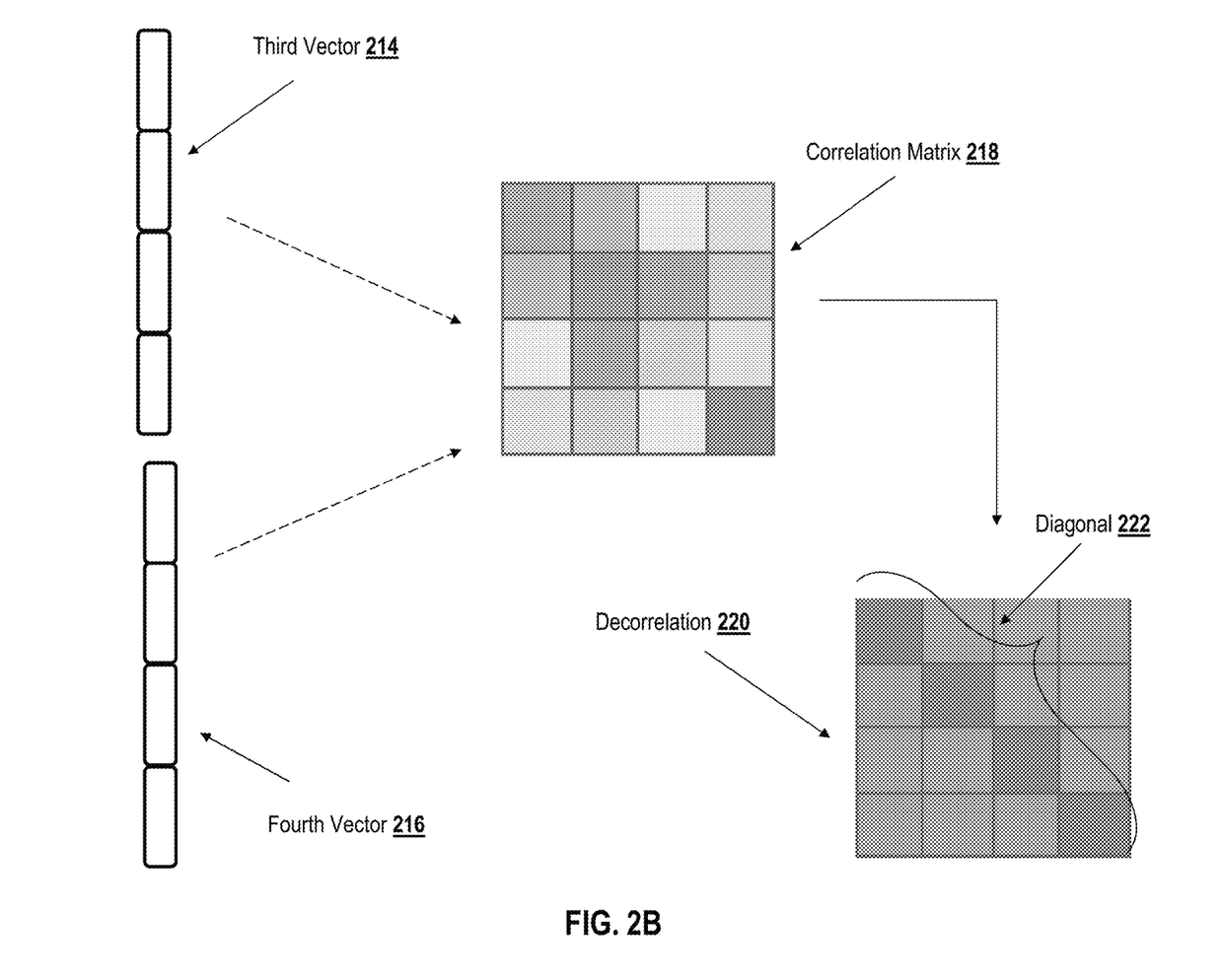
FIG. 2B depicts a representation of the generation of a correlation matrix and the performance of a decorrelation operation, in accordance with some embodiments.

FIGS. 2A-2B depict a process 200 for training of a machine learning model (i.e., the trained machine learning model 106) using SCD to perform sentiment analysis, in accordance with some embodiments.

FIG. 2A depicts a portion of the process 200 for training of the machine learning model, in accordance with some embodiments. In particular, as illustrated in FIG. 2A, two separate and distinct encoding operations may be performed on sentence 201. The sentence 201 include a plurality of words, punctuations, characters, and so forth. For example, a first encoding operation 202 and a second encoding operation 204 are performed on the sentence 201 to generate two separate and distinct embeddings. Embeddings are numerical representations that characterize the subject matter of the sentence 201, namely the text, the punctuations, and so forth. For example, the vector may be an array such as "[numerical element 1, numerical element 2, numerical element 3 . . . numerical element n]." Other vector forms are also contemplated. The output of the first encoding operation 202 and the second encoding operation 204 are a first vector 206 and a second vector 208, each of which include numerical elements that represent a modified version of the sentence 201 in the vector space. It is noted that the contents or subject matter of the sentence 201 is not altered before, during, or after the performing of the first encoding operation 202 and the second encoding operation 204. In other words, the first encoding operation 202 occurs in the vector or embedding space and the training data operates as input is not altered.

Instead, during the encoding operations, different dropout rates or ratios are utilized to randomly mask numerical elements representative of the text, punctuation, and so forth, of the sentence 201. In this way, subsequent to the first encoding operation 202 and the second encoding operation 204, two different vector representations of the sentence 201 are generated that, based on the dropout rates or ratios, correspond to modified or altered versions of the sentence 201 in the vector or embedding space. For example, if the sentence 201, upon which the first encoding operation 202 and the second encoding operation 204 are performed, is "I have a black phone", the embeddings or vector representations generated as a result of each of the first encoding operation 202 and the second encoding operation 204 may include elements that represent a modified or slightly altered version of "I have a black phone." The degree of variation depends on the dropout rates or ratios.

In aspects, a dropout ratio of the first encoding operation 202 is less than the dropout ratio of the second encoding operation 204, and as such, the degree of variation of the embedding or vector representation resulting from the first encoding operation 202. Returning to the above example, the result of the first encoding operation 202 could be the generation of the first vector 206, in which a subset of numerical elements are masked or altered. As a result, the first vector 206 (e.g., first vector representation of the sentence 201) may include numerical elements corresponding to a sentence such as, e.g., "You have a black phone." As such, the first vector 206 may satisfy a first similarity threshold relative to a sentiment of the sentence 201, which may be based on the numerical elements of the first vector 206 correspond to the sentence of "You have a black phone." In aspects, the result of the second encoding operation 204 could be the generation of the second vector 208, in which a larger subset of numerical elements are masked or altered relative to the first encoding operation 202. As a result, the second vector 208 may including numerical elements corresponding to a sentence such as, e.g., "have a phone", or "He has phone", and so forth. As such, the second vector 208 may satisfy a second similarity threshold relative to a sentiment of the sentence 201, which may be based on the numerical elements of the first vector 206 correspond to the sentence of "have a phone" or "He has phone", and so forth. In aspects, as the second vector 208 includes elements that represent a sentence that is more dissimilar to the sentence 201 than the elements of the first vector 206, the second threshold similarity can be determined to be less than the first similarity threshold.

In aspects, as the dropout ratio for the second encoding operation 204 is larger than that of the first encoding operation 202, the variation from the sentence 201, as a result of the second encoding operation 204, is larger than that the variation that results from the first encoding operation 202. While the sentence 201 is described above and illustrated in FIG. 2A, a plurality of sentences included as part of a batch may be utilized to train the model.

In aspects, training of the model may involve generating two embeddings (corresponding to two different views) of a particular sentence or text, for a large number of text. Such text may extracted from a large textual database such as, e.g., Wikipedia, public textual databases, propriety textual databases, and so forth. In aspects, augmentations or alterations may be generated in vector form (e.g., embedding space) for each sample $x_i$ in batch X, e.g., which may comprise a plurality of text. Batches are generated from samples of a set of training data in the form of $\mathcal{D} = \{(x_i)\}_{i=1}^N$, in which the term "N" denotes the number of sentences.

Further, augmentations or alterations are generated by an encoder, namely an encoder that performs the first encoding operation 202 and the second encoding operation 204. The encoder is represented by a term $f_\theta$. This term is parameterized by $\theta$. In aspects, the output of the encoder are embeddings or vectors of samples associated with the batch X, which is denoted by the term $H^A \in \mathcal{T}$ and $H^B \in \mathcal{T}$. The term $\mathcal{T}$ denotes or defines the vector space or embedding space. Further, the term of $h_i \in \mathcal{T}$ denotes a representation of a particular sentence in vector form. The augmented or altered embeddings produced per sample are then defined as $h_i^A$ and $h_i^B$.

Further, as described above, in order to determine varying vector representations or embeddings, different dropout rates or ratios are utilized. These dropout rates, in operation, enable the random masking or alteration of various elements of the vector representations of these sentences. The randomized masking of various elements during the encoding phase are based on various ratios, e.g., $r_A$ and $r_B$, such that $r_A < r_B$. In aspects, integration of the distinct dropout ratios by the encoder generates the following equations: $h_i^A = f_\theta(x_i, r_A)$ and $h_i^B = f_\theta(x_i, r_B)$.

Returning to FIG. 2A, the first vector 206 and the second vector 208 correspond to the terms and $h_i^A$ and $h_i^B$. The first vector 206 and the second vector 208 may be utilized as part of a joint loss function, which corresponds to the following equation:

$$\min_{G_1, \theta_2} \mathcal{L}_S(f_{\theta 1}) + \alpha \mathcal{L}_C(f_{\theta_1} \cdot p_{\theta_2}) \qquad (1)$$

In the above equation, the term $\mathcal{L}_S$ is utilized to increase or maximize the difference between the values of the first vector 206 and the second vector 208 within a particular threshold, namely to serve as a basis for the self-contrastive divergence technique described herein. Broadly speaking, SCD refers to variations of the subject matter of a particular sentence, which are generated in the vector space, that enables the machine learning model to learn from and generate different or varying embeddings or vector representations using limited sample data such as, for example, a small sample of sentences. In other words, self-contrastive divergence enables for the generation of varying representations of, for example, a particular sentence, in the vector or embedding space, from which a machine learning model is trained.

The term $\mathcal{L}_S$ is determined by the following equation:

$$\mathcal{L}_S = \frac{1}{N} \sum_i^N h_i^A \cdot (h_i^S)^T (\|h_i^A\| \|h_i^S\|)^{-1} \qquad (2)$$

In the above equation, it is noted that the term $\mathcal{L}_S$ comprises cosine similarities of the batch X, which are created from samples of set $\mathcal{D} = \{(x_i)\}_{i=1}^N$, in which the term "N" denotes the number of sentences. In aspects, after the first vector 206 and second vector 208 are generated by the encoder, e.g., as a result of the first encoding operation 202 and the second encoding operation 204, the first vector 206 and the second vector 208 are mapped to a higher dimensional space. For example, a first mapping operation 210 is performed on the first vector 206 and a second mapping operation 212 is performed on the second vector 208. As a result, a third vector 214 and a fourth vector 216 are generated. Each of the third vector 214 (e.g., a first high dimensional vector representation) and the fourth vector 216 (e.g., a second high dimensional vector representation) corresponds to a vector in a higher dimensional space relative to the first vector 206 and the second vector 208. In this space, the elements of the first vector 206 and the second vector 208 are mapped to respective high dimensional vectors, namely vectors having a larger number of elements that represent the subject matter of the first vector 206 and the second vector 208.

With respect to equation 1 above, it is noted that the term $\alpha \in \mathbb{R}$ denotes a hyperparameter and the expression p: $\mathcal{T} \to \mathcal{P}$ is a projector (MLP) that is parameterized by $\theta_2$, which is utilized to map the first vector 206 and the second vector 208 to a high dimensional feature space to generate the third vector 214 (e.g., a first high dimensional vector representation) and the fourth vector 216 (e.g., a second high dimensional vector representation). Such high dimensional feature space may be described by the term $\mathcal{P}$, with $|\mathcal{P}| \gg |\mathcal{T}|$.

FIG. 2B depicts a representation of the generation of a correlation matrix and the performance of a decorrelation operation, in accordance with some embodiments. As illustrated in FIG. 2B, the third vector 214 and the fourth vector 216 are utilized to generate to a correlation matrix 218 upon which decorrelation 220 is performed. As a result of the decorrelation 220 (i.e. decorrelation operation), differences or cross-correlation along a diagonal 222 is increased or maximized to satisfy a threshold and feature redundancy is reduced by a particular threshold by reducing or minimizing correlation beyond the diagonal 222. In short, reduction or minimization in correlation beyond the diagonal 222 involves generating a correlation matrix that mirrors or approximates the diagonal 222. In operation, a vector or embedding represented by the term $h_i$ is projected from the term $\mathcal{T}$ (representing a particular vector space) to a higher dimensional space, which is represented by the term $\mathcal{P}$. For example, it is noted that the expressions of $p_i^* = p(h_i^*)$ and $*|\{A,B\}$ denote augmentation or alteration embedding vectors of sample $x_i$ subsequent to the mapping of a vector to a higher dimensional space using $p(\cdot)$. Thereafter, a correlation matrix 218 is generated using third vector 214 and the fourth vector 216. The entries of the correlation matrix 218 are defined by the expression $C_{j,k}$, which is defined by the following equation:

$$C_{jk} = \sum_i p_{i,j}^A \cdot p_{i,k}^B \left( \sum_i (p_{i,j}^A)^2 (p_{i,k}^B)^2 \right)^{-\frac{1}{2}} \qquad (3)$$

In the above equation, the term $P_{i,j}^* \in \mathbb{R}$ corresponds to the $j^{th}$ component in the projected embedding vector, e.g., the third vector 214. Thereafter a loss objective decorrelation function is utilized to perform the decorrelation 220 on the correlation matrix 218. The decorrelation 220 results in the decorrelated matrix illustrated in FIG. 2B. The loss objective decorrelation function is defined by the following expression:

$$\mathcal{L}_C = -\sum_j (1 - C_{jj})^2 + \lambda \sum_j \sum_{j \neq k} C_{jk}^2 \qquad (4)$$

In the above expression, the first term (e.g., augmentation invariance term), represented by $$-\sum_j (1 - C_{jj})^2,$$

serves to maximize the cross-correlation along the diagonal 222 in order to increase differences or variations within a particular threshold and the second term (e.g., feature redundancy management term), represented by $$\sum_j \sum_{j \neq k} C_{jk}^2,$$

serves to reduce redundancy in feature representation by minimizing correlation beyond the diagonal. As the first term and the second term are divergent, a hyperparameter in the form of $\lambda$ is utilized to control the trade-off between the first term and the second term. In aspects, the hyperparamter is multiplied with the feature redundancy management term, the result of which is summed with the augmentation invariance term.

Regarding the training of the machine learning model (e.g., the trained machine learning model 106), it is noted that the model may be trained in an unsupervised fashion using training data in the form of, for example, $10^6$ random sample sentences from one or more sources, e.g., Wikipedia, public and private sources, and so forth. In aspects, it is noted that the training involve the use of a pre-trained transformer (LM), which is trained with a learning rate of 3.0e-5 for 1 epoch at batch-size of 192. In aspects, a projector MLP represented by the term q, which is utilized to perform the first mapping operation 210 and the second mapping operation 212, has three linear layers, each of which has 4096 output units in conjunction with ReLU and BatchNorm, which are located therebetween. In aspects, hyperparameters values could be $\alpha=0.005$ and $\lambda=0.013$, while dropout rates or ratios could be $r_A=5.0\%$ and $r_B=15.0\%$. In other aspects, the hyperparameters values could be $\alpha=0.0033$ and $\lambda=0.028$, while dropout rates or ratios could be $r_A=6.5\%$ and $r_{B=24.0}\%$. Other variations of the hyperparameters, dropout rates, and ratios are also contemplated. It is noted that these values may be obtained as a result of a grid-search such that a first coarse-grid may be implemented with step-size of 0.1 for $\alpha$, and 10% dropout rates may be set for $r_A$ and $r_B$. For, the coarse-grid may include different magnitudes, for example, {0.1, 0.01, 0.001} and fine-grid with a step-size of 0.01 and 1%, respectively, may be designated.

Subsequent to the training of the machine learning model as described above, the results of the self-contrastive divergence based training of the machine learning model are compared to other techniques across seven standard semantic textual similarity tasks. The results of these comparisons are provided in Table 1 presented below.

TABLE 1

| Semantic Textual Similarity (STS) Benchmark | | | | | | | | |
|---|---|---|---|---|---|---|---|---|
| Model | STS12 | STS13 | STS14 | STS15 | STS16 | STS-B | SICK-R | Avg. |
| GloVe embeddings (avg.)* | 55.14 | 70.66 | 59.73 | 68.25 | 63.66 | 58.02 | 53.76 | 61.32 |
| BERT$_{base}$ [CLS]-embedding | 21.54 | 32.11 | 21.28 | 37.89 | 44.24 | 20.29 | 42.42 | 31.40 |
| BERT$_{base}$(first-last avg)◇ | 39.70 | 59.38 | 49.67 | 66.03 | 66.19 | 53.87 | 62.06 | 56.70 |
| BERT$_{base}$-flow◇ | 58.40 | 67.10 | 60.85 | 75.16 | 71.22 | 68.66 | 64.47 | 66.55 |
| BERT$_{base}$-whitening◇ | 57.83 | 66.90 | 60.90 | 75.08 | 71.31 | 68.24 | 63.73 | 66.28 |
| IS-BERT$_{base}$▽ | 56.77 | 69.24 | 61.21 | 75.23 | 70.16 | 69.21 | 64.25 | 66.58 |
| CT-BERT$_{base}$◇ | 61.63 | 76.80 | 68.47 | 77.50 | 76.48 | 74.31 | 69.19 | 72.05 |
| SimCSE-BERT$_{base}$ | 68.05 | 80.38 | 72.62 | 78.96 | 76.90 | 75.11 | 69.37 | 74.48 |
| * SCD-BERT$_{base}$ | 66.94 | 78.03 | 69.89 | 78.73 | 76.23 | 76.30 | 73.18 | 74.19 |

TABLE 1-continued

Semantic Textual Similarity (STS) Benchmark

| Model | STS12 | STS13 | STS14 | STS15 | STS16 | STS-B | SICK-R | Avg. |
|---|---|---|---|---|---|---|---|---|
| RoBERTa$_{base}$ [CLS]-embedding | 16.67 | 45.56 | 30.36 | 55.08 | 56.99 | 38.82 | 61.89 | 43.62 |
| RoBERTa$_{base}$(first-last avg)$^\diamond$ | 40.88 | 58.74 | 49.07 | 65.63 | 61.48 | 58.55 | 61.63 | 56.57 |
| SimCSE-RoBERTa$_{base}$ | 67.05 | 80.01 | 70.93 | 79.66 | 80.06 | 78.38 | 68.30 | 74.91 |
| * SCD-RoBERTa$_{base}$ | 63.53 | 77.79 | 69.79 | 80.21 | 77.29 | 76.55 | 72.10 | 73.89 |

As shown in the above table, the results of the SCD, namely SCD-BERT$_{base}$ and SCD-ROBERTa$_{base}$ based training compares well with various approaches. In particular, the average values of the Sematic Textual Similarity Benchmark for SCD-BERT$_{base}$ (74.19) and SCD-ROBERTa$_{base}$ (73.89) are nearly identical to the best averages of the techniques of SimCSE-BERT$_{base}$ (74.48) and the SimCSE-ROBERTa$_{base}$ (74.91), for the BERT and ROBERTa language models, respectively.

Additionally, the self-contrastive divergence based training of the machine learning model are compared to other techniques across seven transfer tasks as well. The results of these comparisons are provided in Table 2 presented below.

TABLE 2

Transfer Benchmark

| Model | MR | CR | SUBJ | MPQA | SST | TREC | MRPC | Avg. |
|---|---|---|---|---|---|---|---|---|
| GloVe embeddings (avg.)* | 77.25 | 78.30 | 91.17 | 87.85 | 80.18 | 83.00 | 72.87 | 81.52 |
| Skip-thought$^\diamond$ | 76.50 | 80.10 | 93.60 | 87.10 | 82.00 | 92.20 | 73.00 | 83.50 |
| Avg. BERT embeddings* | 78.66 | 86.25 | 94.37 | 88.66 | 84.40 | 92.80 | 69.54 | 84.94 |
| BERT [CLS]-embedding | 81.83 | 87.39 | 95.48 | 88.21 | 86.49 | 91.00 | 72.29 | 86.10 |
| IS-BERT$_{base}$$^\diamond$ | 81.09 | 87.18 | 94.96 | 88.75 | 85.96 | 88.64 | 74.24 | 85.83 |
| SimCSE-BERT$_{base}$ | 80.74 | 85.75 | 93.96 | 88.60 | 84.57 | 86.20 | 73.51 | 84.76 |
| * SCD-BERT$_{base}$ | 73.21 | 85.80 | 99.56 | 88.67 | 85.89 | 89.80 | 75.71 | 85.52 |
| RoBERTa [CLS]-embedding | 81.27 | 84.77 | 94.15 | 84.18 | 86.71 | 81.20 | 72.17 | 83.49 |
| SimCSE-RoBERTa$_{base}$ | 65.00 | 87.28 | 99.60 | 86.63 | 87.26 | 80.80 | 72.23 | 82.69 |
| * SCD-RoBERTa$_{base}$ | 82.17 | 87.76 | 93.67 | 85.69 | 88.19 | 83.40 | 76.23 | 85.30 |

As shown in the above table, the results of the SCD, namely SCD-BERT$_{base}$ and SCD-ROBERTa$_{base}$ based training compares well with various approaches. In particular, the average values of the Transfer Benchmark for SCD-BERT$_{base}$ (85.52) are nearly identical to BERT [CLS]-embedding, which is the technique having the highest average of 86.10 across the seven transfer tasks for the BERT language models. Further, SCD-ROBERTa$_{base}$ has the best average across the seven transfer techniques of 85.30 for ROBERTa language models. It is further noted that the terms of $\mathcal{L}_S$ and $\mathcal{L}_C$ operate in a competitive manner such that the equilibrium of these terms provides an appropriate or optimal solution.

Figure 3:
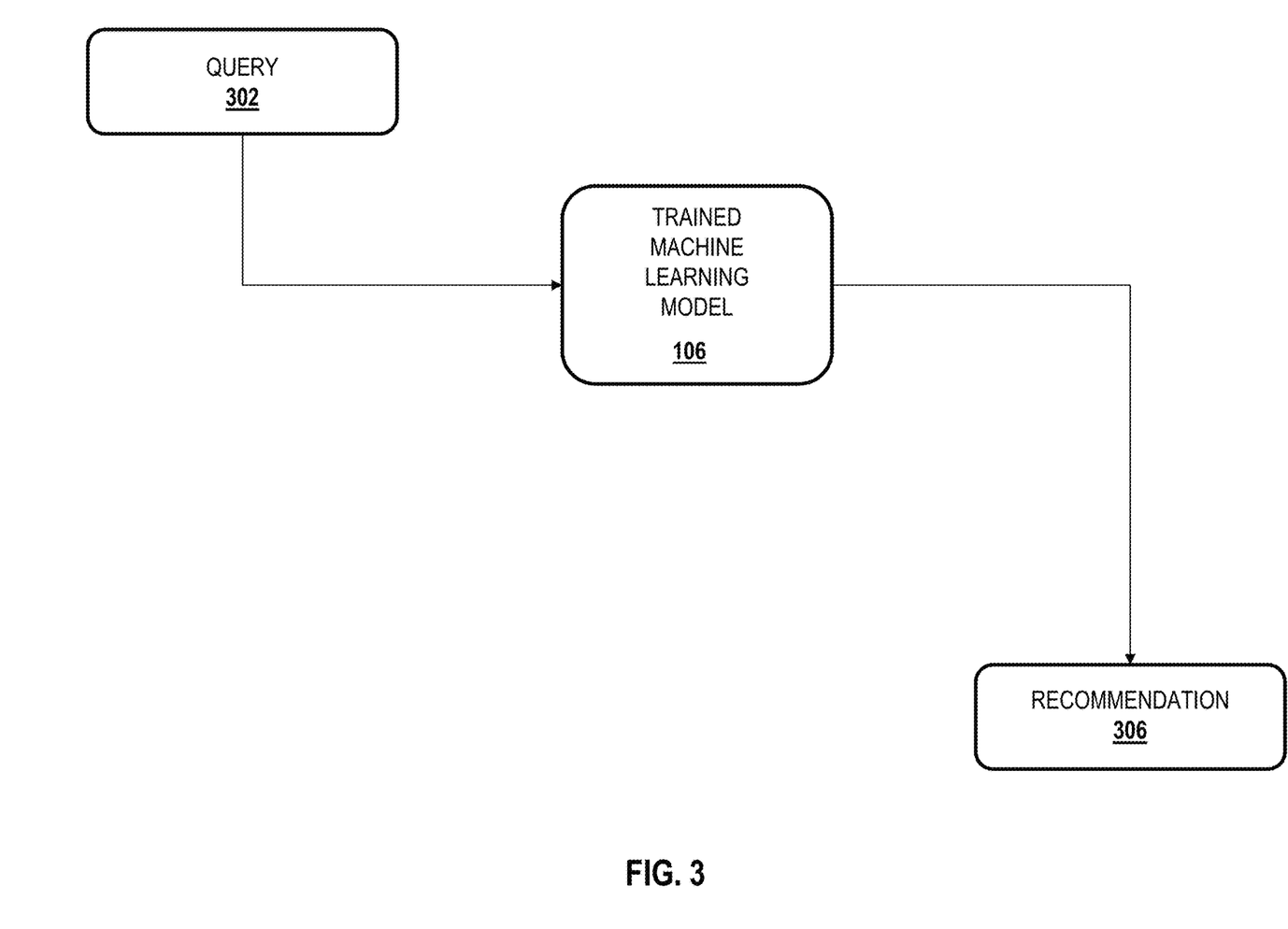
FIG. 3 depicts a graphical representation of the implementation of the machine learning model with respect to various real world operations, in accordance with some embodiments.

FIG. 3 depicts a graphical representation of the implementation of the trained machine learning model 106 with respect to various real world operations, in accordance with some embodiments.

In aspects, the trained machine learning model 106 described herein may operate to perform semantic textual similarity operations, sentence similarity matching and retrieval, and so forth. For example, a query 302 may be received by the trained machine learning model 106, which operates on the computer 102. The query 302 may be, e.g., a request to identify service requests (e.g., related to information technology ("IT") support problems) similar to another service request problem. For example, the query 302 may be that "I am unable to login into my laptop" and the trained machine learning model 106 may identity another service problem that is semantically very similar to the query 302 such as, e.g., "I am having issues logging into my computer", and so forth, and generate a recommendation 306 that captures this result. In embodiments, the trained machine learning model 106 may determine that the sentence of "I am having issues logging into my computer" is within a particular threshold similarity of the sentence "I am unable to login into my laptop." In aspects, the threshold similarity may be characterized by a similarity metric that may range from 1 to 10, with 1 indicating a high level of similarity such as 80%, 90%, and so forth, and 10 indicating a low level of similarity such as 15%, 10%, and so forth.

In aspects, the trained machine learning model 106 may identify a list of ten of fifteen service requests or problems that are similar to the query 302 and list these results in chronological order, order of relevance, and so forth. In aspects, another example of the query 302 may be a question such as, e.g., "Find me a vehicle having the horsepower and dimensions of the most expensive Ferrari on the market today." In response, the trained machine learning model 106 may generate recommendation 306 that identifies an article, a title of an article, a product in the form of a vehicle, and so forth, that matches the query 302. For example, the recommendation 306 to such a query could be a listing of five vehicles having horsepower and dimensions that are very similar to the most expensive Ferrari on the market today, two articles that address precisely the issue of the horsepower and dimensions of the most expensive Ferrari as relating to competitors of the most expensive Ferrari, and so forth.

Figure 4:
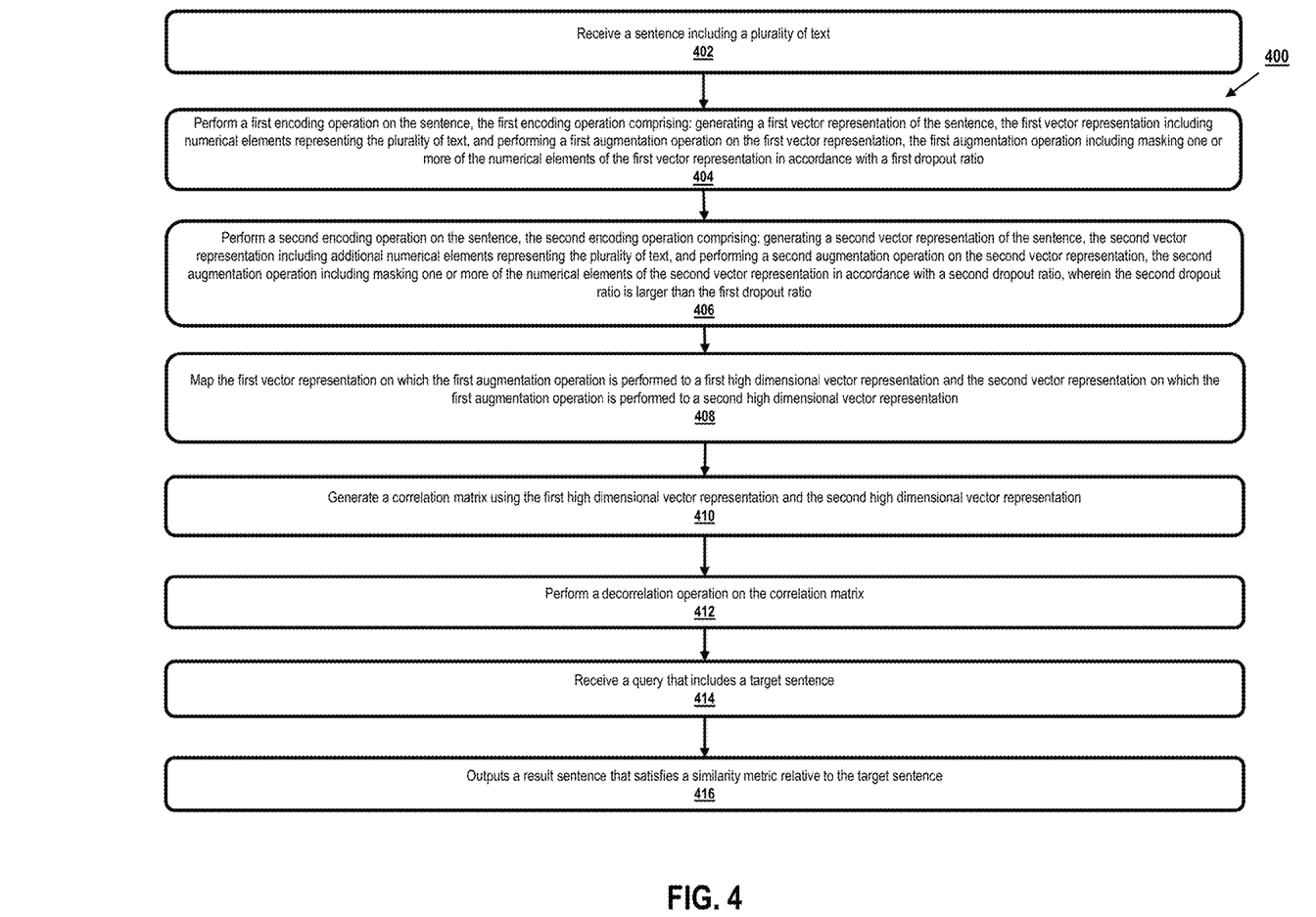
FIG. 4 depicts a flow diagram for implementing the trained machine learning model based on self-contrastive decorrelation, in accordance with some embodiments.

FIG. 4 depicts a flow diagram 400 that includes steps for training of a machine learning model and implementing the trained machine learning model (i.e. the trained machine learning model 106 described above), in accordance with some embodiments. It is noted that, with respect to FIG. 4, blocks 402 to 412 list the steps that are associated with the training of the machine learning model and block 414 and 416 list an implementation and application of the trained machine learning model.

At block 402, a sentence including a plurality of text may be received by a model. In aspects, the sentence may include letters, punctuations, numbers, and so forth. Further, in aspects, instead of a sentence that includes text, one or more images, a video file, an audio file, and so forth may also be input into the machine learning model for the purpose of training the model.

At block 404, a first encoding operation may be performed on the sentence. In aspects, the first encoding operation comprises generating a first vector representation of the sentence. The first vector representation includes numerical elements representing the plurality of text. Further the first encoding operation comprises performing a first augmentation operation on the first vector representation. The first augmentation operation includes masking one or more of the numerical elements of the first vector representation in accordance with a first dropout ratio. For example, as described with respect to FIG. 2A above, vector representations may correspond to arrays that include a plurality of numbers, with each number representing one or more characters (e.g., letters, punctuations, and so forth) of the text. Further, as described above, one or more of these numbers may be masked or removed as part of the training process in accordance with a percentage, fraction, or ratio, e.g., a first dropout ratio. In aspects, the first vector representation of the sentence may be representative of a sentence that is similar to the sentence of block 402 that was input into the model in accordance with a particular similarity metric, e.g., 90% similar, 80% similar, and so forth. In other words, a few numbers may be masked such that a high level of similarity with the sentence of block 402 may be maintained.

At block 406, a second encoding operation may be performed on the sentence. In aspects, the second encoding operation comprises generating a second vector representation of the sentence. The second vector representation includes numerical elements representing the plurality of text. Further the second encoding operation comprises performing a second augmentation operation on the second vector representation. The second augmentation operation includes masking one or more of the numerical elements of the second vector representation in accordance with a second dropout ratio. As described above with respect to FIGS. 2A-2B and similar to block 404, another vector representation of the sentence may be generated. This vector representation (the second vector representation) may include numbers representative of a sentence that is similar to the sentence of block 402 that was input into the model in accordance with another similarity metric, e.g., 10%, 15%, 20%, and so forth. In other words, a high proportion of numbers relative to the numbers in block 404 may be masked in order to generate the second vector representation. As such, the second vector representation may define a sentence that is more dissimilar to the input sentence at block 402 than the sentence defined by the first vector representation as defined in block 404.

At block 408, the first vector representation on which the first augmentation operation is performed is mapped to a first high dimensional vector representation and the second vector representation on which the first augmentation operation is performed is mapped to a second high dimensional vector representation. For example, as described in FIGS. 2A-2C, the first vector representation and the second vector representation are represented with two separate and distinct high dimensional vectors. Each of the first high-dimensional vector and the second high-dimensional vector represent the elements of the first vector representation and the second vector representation using a larger number of number or vector elements.

At block 410, a correlation matrix may be generated using the first high dimensional vector representation and the second high dimensional vector representation. As described above with respect to FIG. 2B, a correlation matrix is generated and may be defined by equation (3) included above. The correlation matrix defines a spectrum of vector representations that include sentences that are highly similar to the original input sentence (at block 402) and relatively dissimilar to the original input sentence.

At block 412, a decorrelation operation on the correlation matrix may be performed. For example, as described above and depicted in FIG. 2B, as a result of the decorrelation operation, differences or cross-correlation along a diagonal 222 may be increased or maximized to satisfy a threshold and feature redundancy may be reduced by a particular threshold by reducing or minimizing correlation beyond the diagonal 222.

At block 414, a query that includes a target sentence may be received by the trained machine learning model. As described above with respect to FIG. 3, a query may include a sentence such as "I am having issues logging into my computer" and the trained machine learning model may identify another sentence semantically similar or identical to such a sentence, e.g., "I am having issues logging into my computer." For a technical support person that often deals with a ton of complex issues for which an answer may not be readily available, the trained machine learning model may operate to identify sentences describing issues that are similar to a current issue that the technical person is troubleshooting in a timely and efficient basis.

At block 416, the trained machine learning model may generate an output that satisfies a similarity metric relative to the target sentence. As described above with respect to block 414, the trained machine learning model may output a similar sentence such as, e.g., "I am unable to login into my laptop", which is may have a similarity metric of 90% or 85% relative to the query at block 414, which includes the sentence of "I am having issues logging into my computer."

Figure 5:
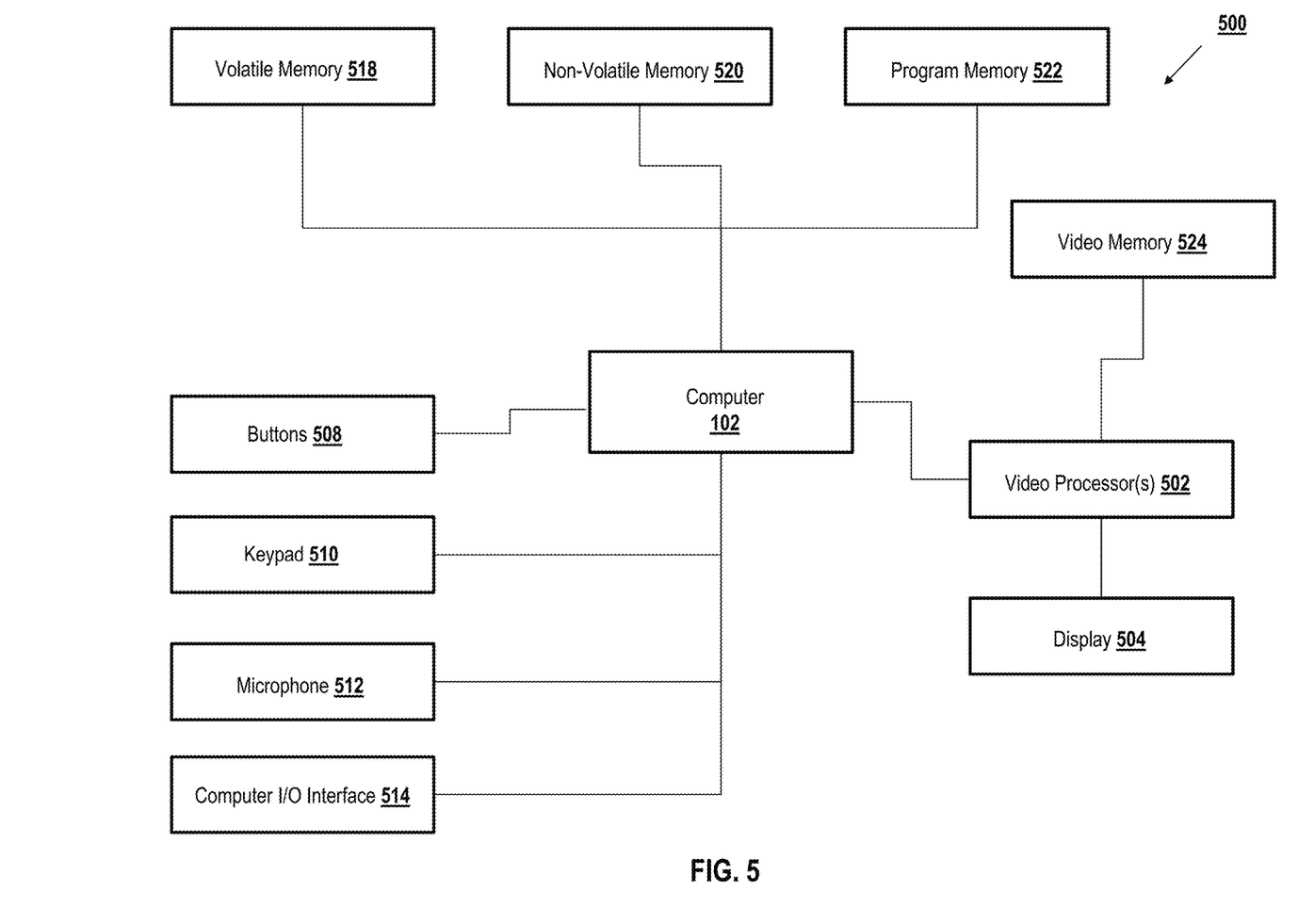
FIG. 5 depicts a computing system that may implement the trained machine learning model, according to some embodiments, in accordance with some embodiments.

FIG. 5 depicts a computing system 500 that may implement the trained machine learning model 106, according to some embodiments, in accordance with some embodiments. The computing system may include the computer 102 that is communicatively coupled (wired or wirelessly coupled) to a display 504, a keypad 510 (e.g., a keyboard) one or more sensors implanted in the brain of a patient, and one or more brain machine interfaces that are external to the computer 102. The computer 102 may also include video processors 502, buttons 508, a microphone 512, a computer input/output interface 514, memory in the form of volatile memory 518, non-volatile memory 520, and program memory 522.

The video processors 502 can provide/receive commands, status information, streaming video, still video images, and graphical overlays to/from the computer 102 and may be comprised of FPGAs, DSPs, or other processing elements which provide functions such as image capture, image enhancement, graphical overlay merging, distortion correction, frame averaging, scaling, digital zooming, overlaying, merging, flipping, motion detection, and video format conversion and compression.

The computer 102 can be used to manage the user interface by receiving input via buttons 508, keypad 510, and/or microphone 512, in addition to providing a host of other functions, including image, video, and audio storage and recall functions, system control, and measurement processing. The buttons 508 and/or keypad 510 also can be used for menu selection and providing user commands to the server 110 (e.g., freezing or saving a still image). The microphone 512 can be used by the inspector to provide voice instructions to freeze or save a still image.

The video processors 502 can also communicate with video memory 524, which is used by the video processors 502 for frame buffering and temporary holding of data during processing. The computer 102 can also communicate with program memory 522 for storage of programs executed by the computer 102. In addition, the server 110 can be in communication with the volatile memory 518 (e.g., RAM), and the non-volatile memory 520 (e.g., flash memory device, a hard drive, a DVD, or an EPROM memory device). The non-volatile memory 520 is the primary storage for streaming video and still images.

The computer 102 can also be in communication with a computer input/output interface 514, which provides various interfaces to peripheral devices and networks, such as USB, Firewire, Ethernet, audio I/O, and wireless transceivers. This computer input/output interface 514 can be used to save, recall, transmit, and/or receive still images, streaming video, or audio. For example, a USB "thumb drive" or Compact-Flash memory card can be plugged into computer input/output interface 514. In addition, the computing system 500 can be configured to send frames of image data or streaming video data to an external computer or server. The computing system 500 can incorporate a TCP/IP communication protocol suite and can be incorporated in a wide area network including a plurality of local and remote computers, each of the computers also incorporating a TCP/IP communication protocol suite.

Further non-limiting aspects or embodiments are set forth in the following numbered examples:

Example 1: A computer-implemented method comprising: training a machine learning model by: receiving a sentence including a plurality of text; performing a first encoding operation on the sentence, the first encoding operation comprising: generating a first vector representation of the sentence, the first vector representation including numerical elements representing the plurality of text, and performing a first augmentation operation on the first vector representation, the first augmentation operation including masking one or more of the numerical elements of the first vector representation in accordance with a first dropout ratio; performing a second encoding operation on the sentence, the second encoding operation comprising: generating a second vector representation of the sentence, the second vector representation including additional numerical elements representing the plurality of text, and performing a second augmentation operation on the second vector representation, the second augmentation operation including masking one or more of the numerical elements of the second vector representation in accordance with a second dropout ratio, wherein the second dropout ratio is larger than the first dropout ratio; mapping the first vector representation on which the first augmentation operation is performed to a first high dimensional vector representation and the second vector representation on which the first augmentation operation is performed to a second high dimensional vector representation; generating a correlation matrix using the first high dimensional vector representation and the second high dimensional vector representation; performing a decorrelation operation on the correlation matrix; receiving, by the machine learning model that is trained, an query that includes a target sentence; and outputting, using the machine learning model that is trained, a result sentence that satisfies a similarity metric relative to the target sentence.

Example 2: The computer-implemented method of example 1, wherein the first vector representation of the sentence on which the first augmentation operation is performed satisfies a first similarity threshold relative to a sentiment of the sentence including the plurality of text.

Example 3: The computer-implemented method of example 1 or 2, wherein the second vector representation of the sentence on which the second augmentation operation is performed satisfies a second similarity threshold relative to the sentiment of the sentence including the plurality of text.

Example 4: The computer-implemented method of any one of examples 1-3, wherein the second similarity threshold is less than the first similarity threshold.

Example 5: The computer-implemented method of any of examples 1-4, wherein the performing of the decorrelation operation on the correlation matrix is based on implementation of a loss objective decorrelation function.

Example 6: The computer-implemented method of any one of examples 1-5, wherein the loss objective decorrelation function comprises an augmentation invariance term, feature redundancy management term, and a hyper-parameter.

Example 7: The computer-implemented method of any one of examples 1-6, wherein the performing of the decorrelation operation based on the implementation of the loss objective decorrelation function comprises: multiplying the hyper-parameter with the feature redundancy management term; and summing the augmentation invariance term with the multiplying of the hyper-parameter with the feature redundancy management term.

Example 8: The computer-implemented method of any one of examples 1-7, further comprising: receiving an image; performing a third encoding operation on the image, the first encoding operation comprising: generating a third vector representation of the image, the third vector representation including numerical elements representing the image, and performing a third augmentation operation on the third vector representation, the third augmentation operation including masking one or more of the numerical elements of the third vector representation in accordance with a third dropout ratio; performing a fourth encoding operation on the image, the fourth encoding operation comprising: generating a fourth vector representation of the image, the fourth vector representation including additional numerical elements representing the image, and performing a fourth augmentation operation on the fourth vector representation, the fourth augmentation operation including masking one or more of the numerical elements of the fourth vector representation in accordance with a fourth dropout ratio, wherein the fourth dropout ratio is larger than the third dropout ratio; mapping the third vector representation on which the third augmentation operation is performed to a third high dimensional vector representation and the fourth vector representation on which the fourth augmentation operation is performed to a fourth high dimensional vector representation; generating an additional correlation matrix using the third high dimensional vector representation and the fourth high dimensional vector representation; and performing an additional decorrelation operation on the additional correlation matrix.

Example 9: The computer-implemented method of any one of examples 1-8, wherein the performing of the additional decorrelation operation on the additional correlation matrix is based on implementation of a loss-objective decorrelation function.

Example 10: The computer-implemented method of any one of examples 1-9, wherein the loss-objective decorrelation function comprises an augmentation invariance term, feature redundancy management term, and a hyper-parameter.

Example 11: A system comprises at least one data processor; and at least one memory storing instructions, which when executed by the at least one data processor, cause operations comprising: receiving a sentence including a plurality of text; performing a first encoding operation on the sentence, the first encoding operation comprising: generating a first vector representation of the sentence, the first vector representation including numerical elements representing the plurality of text, and performing a first augmentation operation on the first vector representation, the first augmentation operation including masking one or more of the numerical elements of the first vector representation in accordance with a first dropout ratio; performing a second encoding operation on the sentence, the second encoding operation comprising: generating a second vector representation of the sentence, the second vector representation including additional numerical elements representing the plurality of text, and performing a second augmentation operation on the second vector representation, the second augmentation operation including masking one or more of the numerical elements of the second vector representation in accordance with a second dropout ratio, wherein the second dropout ratio is larger than the first dropout ratio; mapping the first vector representation on which the first augmentation operation is performed to a first high dimensional vector representation and the second vector representation on which the first augmentation operation is performed to a second high dimensional vector representation; generating a correlation matrix using the first high dimensional vector representation and the second high dimensional vector representation; performing a decorrelation operation on the correlation matrix; receiving, by the machine learning model that is trained, an query that includes a target sentence; and outputting, using the machine learning model that is trained, a result sentence that satisfies a similarity metric relative to the target sentence.

Example 12: The system of example 11, wherein the first vector representation of the sentence on which the first augmentation operation is performed satisfies a first similarity threshold relative to a sentiment of the sentence including the plurality of text.

Example 13: The system of example 11 or example 12, wherein the second vector representation of the sentence on which the second augmentation operation is performed satisfies a second similarity threshold relative to the sentiment of the sentence including the plurality of text.

Example 14: The system of any of examples 11-13, wherein the second similarity threshold is less than the first similarity threshold.

Example 15: The system of any of examples 11-14, wherein the performing of the decorrelation operation on the correlation matrix is based on implementation of a loss objective decorrelation function.

Example 16: The system of any of examples 11-15, wherein the loss objective decorrelation function comprises an augmentation invariance term, feature redundancy management term, and a hyper-parameter.

Example 17: The system of any of examples 11-16, wherein one of the operations of the performing of the decorrelation operation based on the implementation of the loss objective decorrelation function comprises: multiplying the hyper-parameter with the feature redundancy management term; and summing the augmentation invariance term with the multiplying of the hyper-parameter with the feature redundancy management term.

Example 18: The system of any of examples 11-17, wherein the operations further comprise: receiving an image; performing a third encoding operation on the image, the first encoding operation comprising: generating a third vector representation of the image, the third vector representation including numerical elements representing the image, and performing a third augmentation operation on the third vector representation, the third augmentation operation including masking one or more of the numerical elements of the third vector representation in accordance with a third dropout ratio; performing a fourth encoding operation on the image, the fourth encoding operation comprising: generating a fourth vector representation of the image, the fourth vector representation including additional numerical elements representing the image, and performing a fourth augmentation operation on the fourth vector representation, the fourth augmentation operation including masking one or more of the numerical elements of the fourth vector representation in accordance with a fourth dropout ratio, wherein the fourth dropout ratio is larger than the third dropout ratio; mapping the third vector representation on which the third augmentation operation is performed to a third high dimensional vector representation and the fourth vector representation on which the fourth augmentation operation is performed to a fourth high dimensional vector representation; generating an additional correlation matrix using the third high dimensional vector representation and the fourth high dimensional vector representation; and performing an additional decorrelation operation on the additional correlation matrix.

Example 19: The system of any of examples 11-18, wherein the performing of the additional decorrelation operation on the additional correlation matrix is based on implementation of a loss-objective decorrelation function.

Example 20: A non-transitory computer-readable storage medium comprising programming code, which when executed by at least one data processor, causes operations comprising: training a machine learning model by: training a machine learning model by: receiving a sentence including a plurality of text; performing a first encoding operation on the sentence, the first encoding operation comprising: generating a first vector representation of the sentence, the first vector representation including numerical elements representing the plurality of text, and performing a first augmentation operation on the first vector representation, the first augmentation operation including masking one or more of the numerical elements of the first vector representation in accordance with a first dropout ratio; performing a second encoding operation on the sentence, the second encoding operation comprising: generating a second vector representation of the sentence, the second vector representation including additional numerical elements representing the plurality of text, and performing a second augmentation operation on the second vector representation, the second augmentation operation including masking one or more of the numerical elements of the second vector representation in accordance with a second dropout ratio, wherein the second dropout ratio is larger than the first dropout ratio; mapping the first vector representation on which the first augmentation operation is performed to a first high dimensional vector representation and the second vector representation on which the first augmentation operation is performed to a second high dimensional vector representation; generating a correlation matrix using the first high dimensional vector representation and the second high dimensional vector representation; performing a decorrelation operation on the correlation matrix; receiving, by the machine learning model that is trained, an query that includes a target sentence; and outputting, using the machine learning model that is trained, a result sentence that satisfies a similarity metric relative to the target sentence.

What is claimed is:

1. A computer-implemented method comprising:
training a machine learning model, the training comprising:
receiving a sentence including a plurality of text;
performing a first encoding operation on the sentence, the first encoding operation comprising generating a first vector representation of the sentence, the first vector representation including first numerical elements representing the plurality of text of the sentence, wherein the first vector representation is generated using a first dropout ratio that modifies, in a vector domain, the sentence by masking one or more of the first numerical elements of the first vector representation;
performing a second encoding operation on the sentence, the second encoding operation comprising generating a second vector representation of the sentence, the second vector representation including second numerical elements representing the plurality of text of the sentence, wherein the second vector representation is generated using a second dropout ratio that modifies, in the vector domain, the sentence by masking one or more of the second numerical elements of the second vector representation, wherein the second dropout ratio is larger than the first dropout ratio;
mapping the first vector representation to a first high dimensional vector representation, and mapping the second vector representation to a second high dimensional vector representation;
generating a correlation matrix using the first high dimensional vector representation and the second high dimensional vector representation; and
performing a decorrelation operation on the correlation matrix to decorrelate the first high dimensional vector representation and the second high dimensional vector representation, a trained machine learning model comprising the decorrelated first high dimensional vector representation and the decorrelated second high dimensional vector representation;
receiving, by the trained machine learning model, a query that includes a target sentence; and
outputting, using the trained machine learning model, a result sentence that satisfies a similarity metric relative to the target sentence.

2. The computer-implemented method of claim 1, wherein the first vector representation satisfies a first similarity threshold relative to a sentiment of the sentence including the plurality of text.

3. The computer-implemented method of claim 2, wherein the second vector representation satisfies a second similarity threshold relative to the sentiment of the sentence including the plurality of text.

4. The computer-implemented method of claim 3, wherein the second similarity threshold is less than the first similarity threshold.

5. The computer-implemented method of claim 1, wherein the performing of the decorrelation operation on the correlation matrix is based on implementation of a loss objective decorrelation function.

6. The computer-implemented method of claim 5, wherein the loss objective decorrelation function comprises an augmentation invariance term, feature redundancy management term, and a hyper-parameter.

7. The computer-implemented method of claim 6, wherein the performing of the decorrelation operation based on the implementation of the loss objective decorrelation function comprises:
multiplying the hyper-parameter with the feature redundancy management term; and
summing the augmentation invariance term with the multiplying of the hyper-parameter with the feature redundancy management term.

8. A system comprising:
at least one data processor; and
at least one memory storing instructions, which when executed by the at least one data processor, cause operations comprising:
training a machine learning model, the training comprising:
receiving a sentence including a plurality of text;
performing a first encoding operation on the sentence, the first encoding operation comprising generating a first vector representation of the sentence, the first vector representation including first numerical elements representing the plurality of text of the sentence, wherein the first vector representation is generated using a first dropout ratio that modifies, in a vector domain, the sentence by masking one or more of the first numerical elements of the first vector representation;
performing a second encoding operation on the sentence, the second encoding operation comprising generating a second vector representation of the sentence, the second vector representation including second numerical elements representing the plurality of text of the sentence, wherein the second vector representation is generated using a second dropout ratio that modifies, in the vector domain, the sentence by masking one or more of the second numerical elements of the second vector representation, wherein the second dropout ratio is larger than the first dropout ratio;
mapping the first vector representation to a first high dimensional vector representation, and mapping the second vector representation to a second high dimensional vector representation;
generating a correlation matrix using the first high dimensional vector representation and the second high dimensional vector representation; and
performing a decorrelation operation on the correlation matrix to decorrelate the first high dimensional vector representation and the second high dimensional vector representation, a trained machine learning model comprising the decorrelated first high dimensional vector representation and the decorrelated second high dimensional vector representation;
receiving, by the trained machine learning model, a query that includes a target sentence; and
outputting, using the trained machine learning model, a result sentence that satisfies a similarity metric relative to the target sentence.

9. The system of claim 8, wherein the first vector representation is performed satisfies a first similarity threshold relative to a sentiment of the sentence including the plurality of text.

10. The system of claim 9, wherein the second vector representation is performed satisfies a second similarity threshold relative to the sentiment of the sentence including the plurality of text.

11. The system of claim 10, wherein the second similarity threshold is less than the first similarity threshold.

12. The system of claim 8, wherein the performing of the decorrelation operation on the correlation matrix is based on implementation of a loss objective decorrelation function.

13. The system of claim 12, wherein the loss objective decorrelation function comprises an augmentation invariance term, feature redundancy management term, and a hyper-parameter.

14. The system of claim 13, wherein one of the operations of the performing of the decorrelation operation based on the implementation of the loss objective decorrelation function comprises:
   multiplying the hyper-parameter with the feature redundancy management term; and
   summing the augmentation invariance term with the multiplying of the hyper-parameter with the feature redundancy management term.

15. A non-transitory computer-readable storage medium comprising programming code, which when executed by at least one data processor, causes operations comprising:
   training a machine learning model, the training comprising:
      receiving a sentence including a plurality of text;
      performing a first encoding operation on the sentence, the first encoding operation comprising generating a first vector representation of the sentence, the first vector representation including first numerical elements representing the plurality of text of the sentence, wherein the first vector representation is generated using a first dropout ratio that modifies, in a vector domain, the sentence by masking one or more of the first numerical elements of the first vector representation;
      performing a second encoding operation on the sentence, the second encoding operation comprising generating a second vector representation of the sentence, the second vector representation including second numerical elements representing the plurality of text of the sentence, wherein the second vector representation is generated using a second dropout ratio that modifies, in the vector domain, the sentence by masking one or more of the second numerical elements of the second vector representation, wherein the second dropout ratio is larger than the first dropout ratio;
   mapping the first vector representation to a first high dimensional vector representation, and mapping the second vector representation to a second high dimensional vector representation;
   generating a correlation matrix using the first high dimensional vector representation and the second high dimensional vector representation; and
   performing a decorrelation operation on the correlation matrix to decorrelate the first high dimensional vector representation and the second high dimensional vector representation, a trained machine learning model comprising the decorrelated first high dimensional vector representation and the decorrelated second high dimensional vector representation;
   receiving, by the trained machine learning model, a query that includes a target sentence; and
   outputting, using the trained machine learning model, a result sentence that satisfies a similarity metric relative to the target sentence.

* * * * *